Patented Sept. 1, 1942

2,294,666

UNITED STATES PATENT OFFICE 2,294,666

WATER SOLUBLE ADHESIVES OBTAINED BY ETHERIFYING WOOD

Michael Jahrstorfer and Julius Beck, Ludwigshafen-on-the-Rhine, Germany, assignors, by mesne assignments, to General Aniline & Film Corporation, New York, N. Y., a corporation of Delaware No Drawing. Application December 7, 1938, Serial No. 244,418. In Germany December 17, 1937

4 Claims. (Cl. 260—231)

The present invention relates to new compounds capable of swelling or dissolving in water and a process of making same from wood.

It has already been proposed to prepare watersoluble cellulose ethers by treatment of the alkali compounds of cellulose with monohalogenacetic acids or their salts.

We have now found that cellulosic compounds containing carboxylic acid groups and being capable of dissolving or swelling in water, can also be prepared by etherifying by the action of monohalogenacetic acids or their salts, in particular monochloracetic acid and its alkali salts, wood which has been pretreated with alkali hydroxide.

For this purpose the wood, preferably in comminuted form, as for example sawdust, is thoroughly mixed with about twice its amount of 30 to 50% aqueous alkali hydroxide solution, thereby incorporating the necessary alkali and water content for the subsequent reaction with monohalogenacetic acid. If the wood to be used is already moist, appropriately stronger alkali hydroxide solution or even solid alkali hydroxide, wholly or in part, may be added to the wood. It is preferable to mix the wood with the alkali hydroxide while cooling. The amount of alkali hydroxide should at least correspond to the amount required for binding the halogen which is present in the monohalogenacetic acid, and for neutralizing the carboxylic group, when the free acid is used for the etherification. When using salts of monohalogenacetic acid, the amount of alkali hydroxide may be smaller.

After standing for a long time while repeatedly kneading, if desired under pressure, there is obtained a homogeneous mass which is then mixed well with monohalogenacetic acid or a salt thereof whereby the mixture becomes slightly heated. It is then allowed to stand preferably for some days at from 20° to 25° C. in order to obtain as complete a reaction as possible. The reaction mixture is then freed from the salts contained therein and the excess of alkali hydroxide, for example by extraction with a suitable solvent, such as methanol or ethanol, and if desired the watersoluble ether carboxylic acid is separated by the addition of dilute acids, as for example acetic acid. The reaction mixture may also be worked up by precipitating the ether carboxylic acid in a water-insoluble form by acidifying the reaction mixture with a strong acid, as for example hydrochloric acid, freeing it from accompanying substances by washing with water and then reconverting it into the watersoluble form by neutralization with ammonia or alkali hydroxide. For many industrial purposes, it is sufficient to neutralize the reaction mixture with a weak acid without further purification.

The compounds thus obtained may readily be brought into a dry form by the usual methods. They are soluble or capable of swelling in water and yield highly viscous solutions which are suitable for the preparation of adhesives. The new process offers the advantage of rendering it possible to prepare industrially valuable substances by the use of various kinds of wood, in particular wood waste, such as sawdust and shavings, instead of from pure cellulose.

The following examples will further illustrate how this invention may be carried out in practice, but the invention is not restricted to these examples.

Example 1

1000 grams of beechwood sawdust are mixed with 1500 cubic centimeters of 35 per cent caustic soda solution and pressed into a vessel. After two days, the mass is crushed into crumbs. 600 grams of monochloracetic acid which have previously been neutralized with 50 per cent caustic soda solution while cooling are then added and the whole kneaded well. After allowing to stand for another two days, the reaction mixture is freed from salts and excess sodium hydroxide by extraction with methanol and dried. The compound thus obtained is a pale brown powder which yields a highly viscous liquid when dissolved in water.

Example 2

A mixture of 1000 grams of pinewood sawdust and 1800 cubic centimeters of 35 per cent caustic soda solution is exposed to a pressure of about 10 atmospheres for 8 hours. 300 grams of monochloracetic acid are then added in small portions to the mixture while continually kneading and the whole is allowed to stand for 4 days. The reaction mixture is acidified with concentrated hydrochloric acid, washed with water while centrifuging and then treated with ammonia until neutral. The resulting substance may serve directly for adhesive purposes.

Example 3

10 kilograms of beechwood sawdust are kneaded for 4 hours in a kneading device with 15 liters of 50 per cent caustic soda solution. 5 kilograms of monochloracetic acid are then added in portions and the mixture kneaded for a further 3 hours. The resulting mixture is freed from salts and sodium hydroxide by treatment with methanol. A compound is thus obtained which yields highly viscous solutions when dissolved in water.

What we claim is:

1. The process of producing organic substances containing carboxylic groups which comprises acting with a member of the group consisting of monohalogen acetic acids and their salts on comminuted wood with its principal natural components to render the material treated soluble in water, said comminuted wood having been pretreated with an aqueous alkali metal hydroxide.

2. The process of producing organic substances containing carboxylic groups which comprises acting with sodium monochloroacetate on comminuted wood with its principal natural components to render the material treated soluble in water, said comminuted wood having been pretreated with aqueous sodium hydroxide.

3. Water-soluble organic substances containing carboxylic groups obtained by the action of a member of the group consisting of the monohalogen acetic acids and their salts on comminuted wood with its principal natural components and having been pretreated with an aqueous alkali metal hydroxide.

4. Water-soluble organic substances containing carboxylic groups obtained by the action of sodium monochloroacetate on comminuted wood with its principal natural components and having been pretreated with aqueous sodium hydroxide.

MICHAEL JAHRSTORFER.
JULIUS BECK.